United States Patent [19]

Peterson et al.

[11] 4,106,272
[45] Aug. 15, 1978

[54] GRASS COLLECTING MULTIPLE BLADE MOWER WITHOUT AUXILIARY BLOWER MEANS

[75] Inventors: James F. Peterson, Cedarburg; Edward Freier, Jr., Port Washington; Gerald C. Burmesch, Belgium, all of Wis.

[73] Assignee: Allis-Chalmers Corporation, Milwaukee, Wis.

[21] Appl. No.: 747,694

[22] Filed: Dec. 6, 1976

[51] Int. Cl.² .......................................... A01D 35/22
[52] U.S. Cl. ..................................... 56/202; 56/13.4; 56/16.6
[58] Field of Search ....................... 56/202, 13.4, 11.6, 56/13.6, 13.7, 13.3, 16.6

[56] References Cited
U.S. PATENT DOCUMENTS

| | | | |
|---|---|---|---|
| 3,461,654 | 8/1969 | Plamper | 56/11.6 |
| 3,716,977 | 2/1973 | Jackson | 56/202 |

*Primary Examiner*—Russell R. Kinsey
*Attorney, Agent, or Firm*—Charles L. Schwab

[57] ABSTRACT

The four-wheel lawn and garden tractor has an underslung two blade mower unit and a rear mounted grass catcher. The multiple spindle mower unit incorporates special baffling to improve lateral movement of cut grass from the mower housing. The conduit between the mower housing discharge opening and the rear mounted grass catcher includes a unique elbow part having a configuration which facilitates efficient movement of the grass from the mower to the catcher. The grass catcher is vented so that there is very little back pressure in the interior of the grass catcher. Venting is accomplished by provision of a downwardly facing opening along the rear of the grass catcher cover, the latter being molded of an impervious plastic material. The grass catcher cover has a downwardly extending skirt at the front thereof with a pair of laterally spaced semicircular notches adapted to receive a discharge conduit. Thus the cover may be used on tractor mowers discharging to either their left or right side.

9 Claims, 21 Drawing Figures

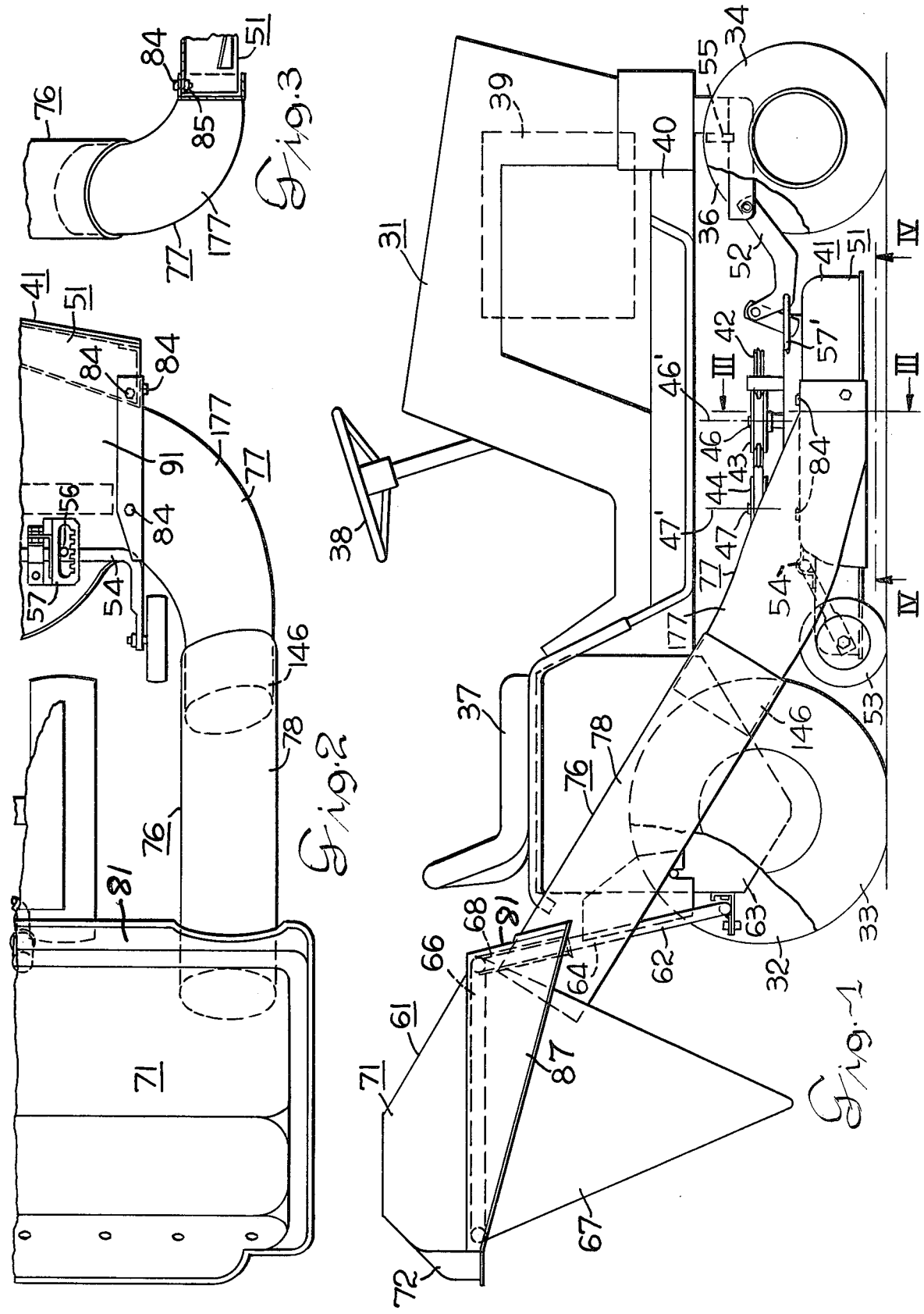

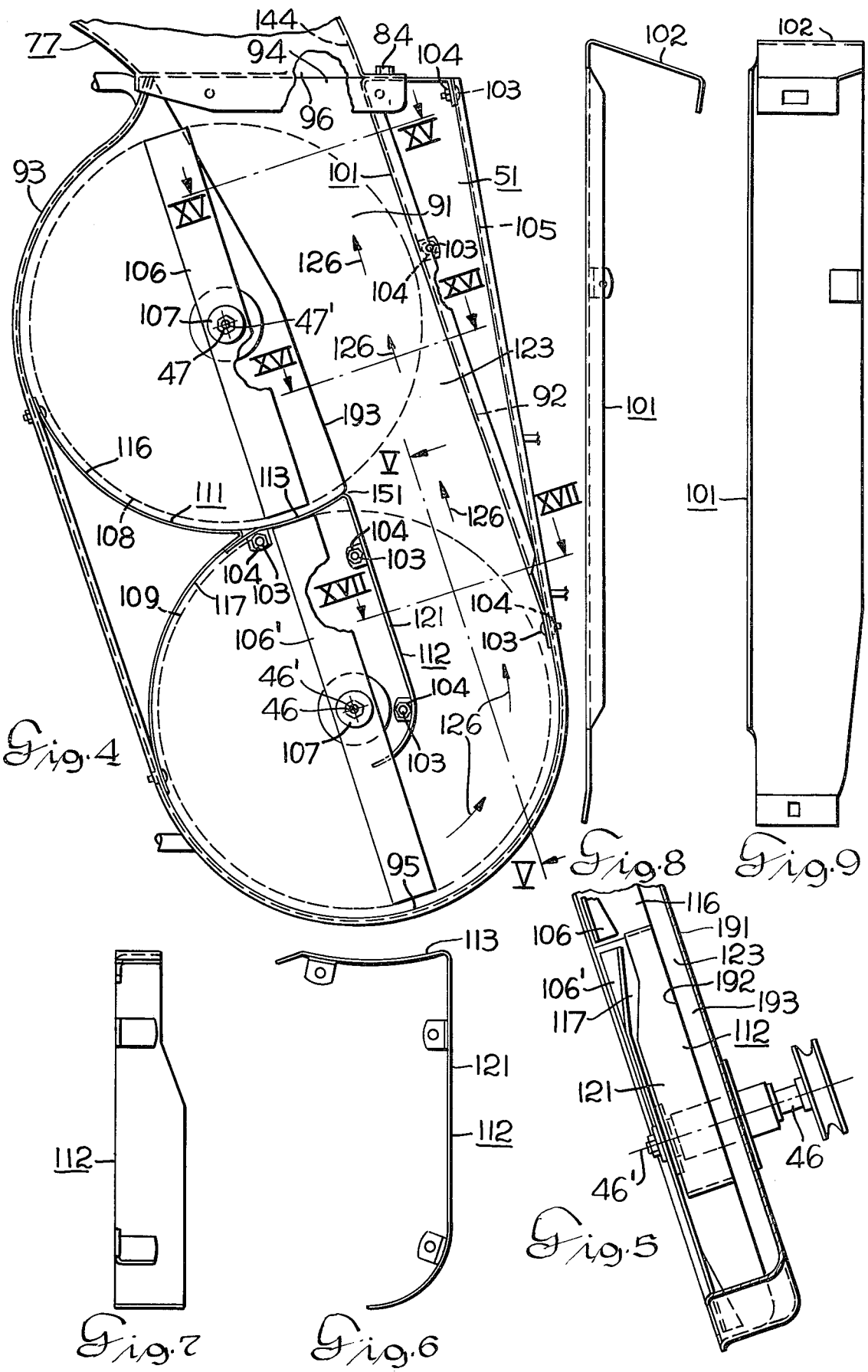

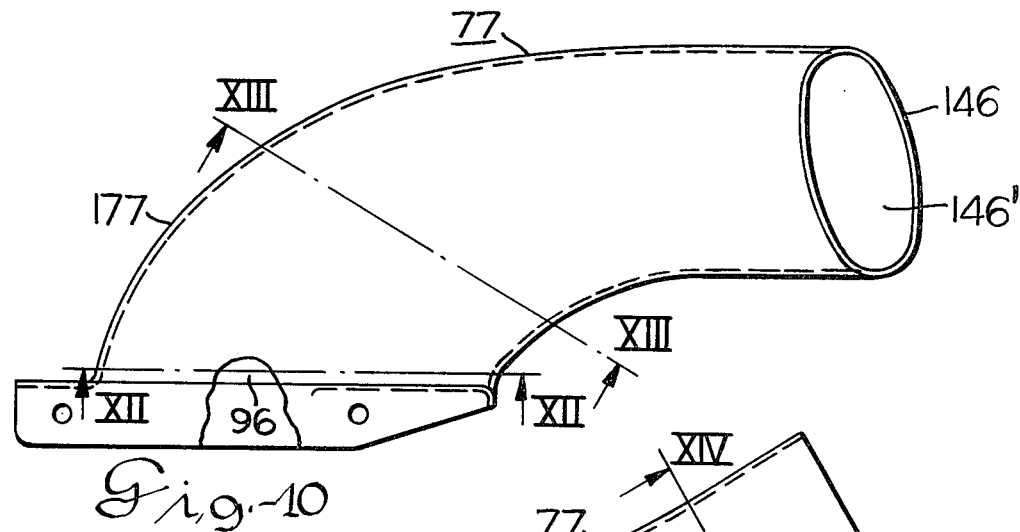
Fig. 10
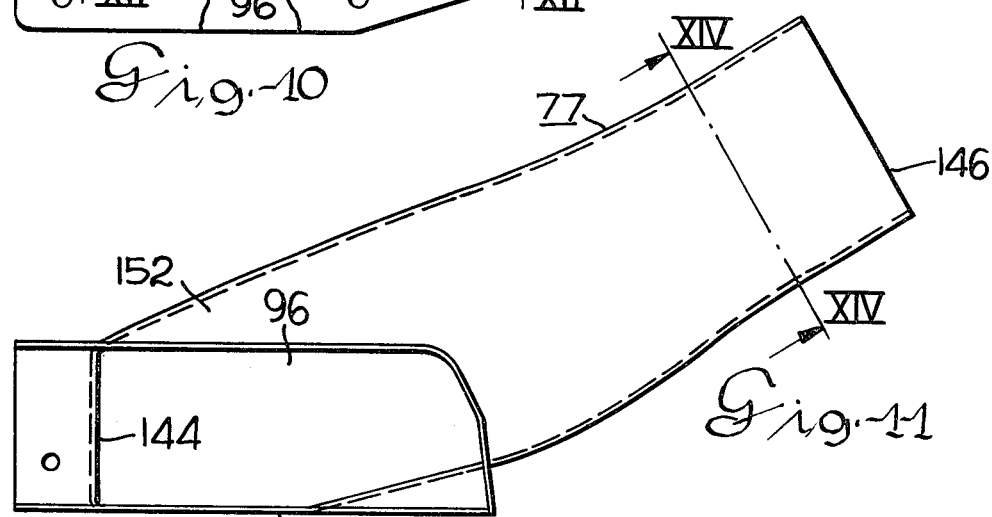
Fig. 11
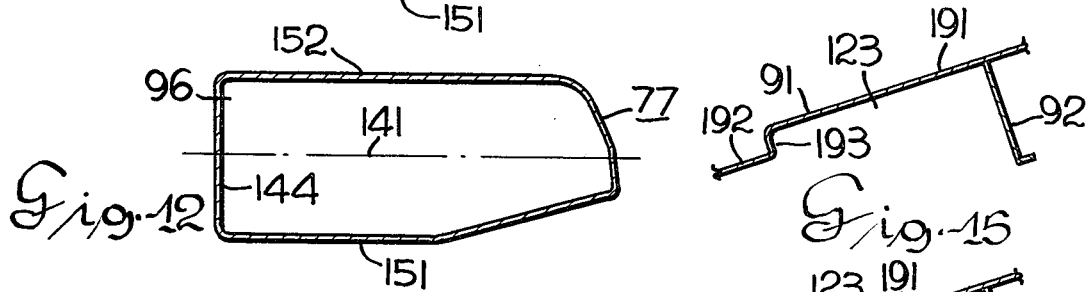
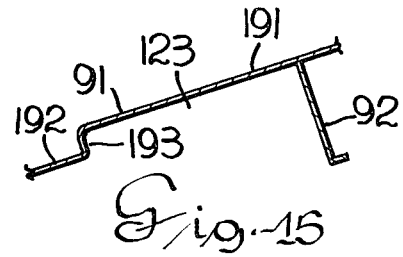
Fig. 12    Fig. 15
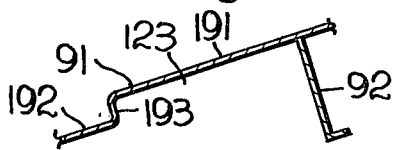
Fig. 13    Fig. 16
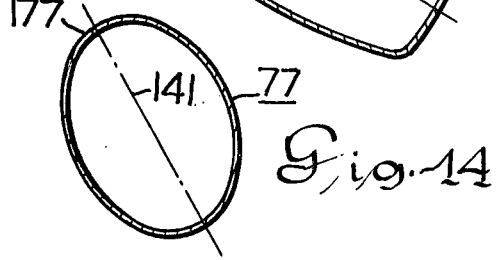
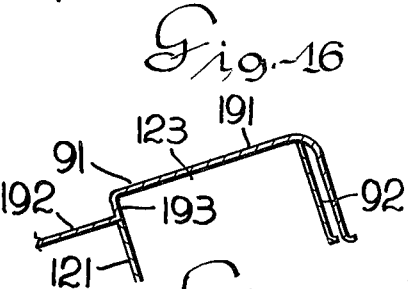
Fig. 14    Fig. 17

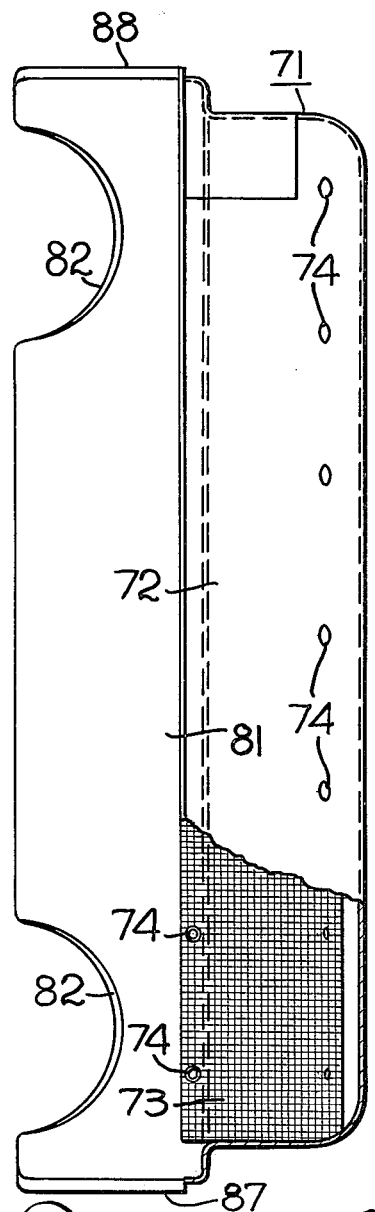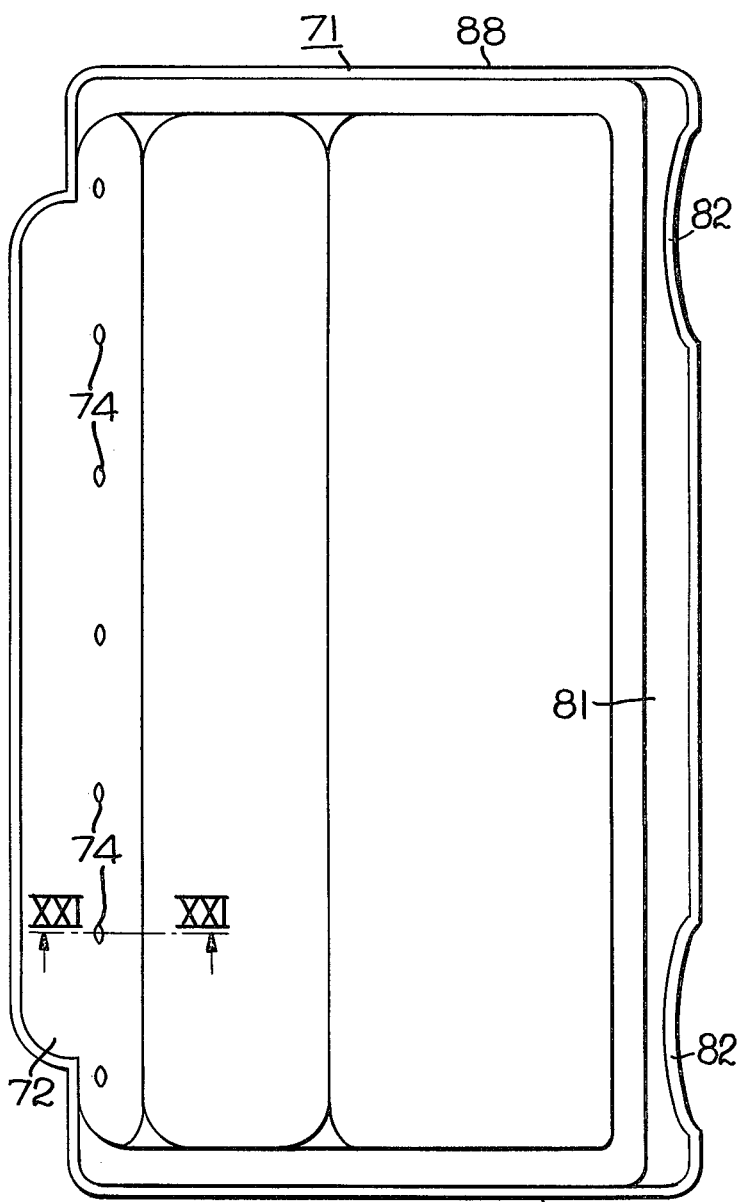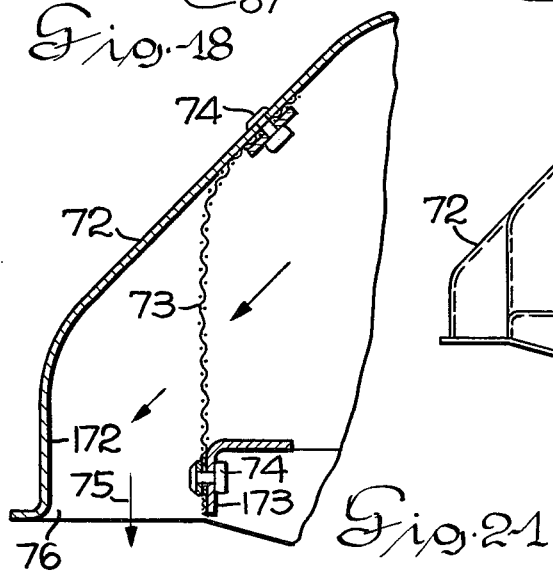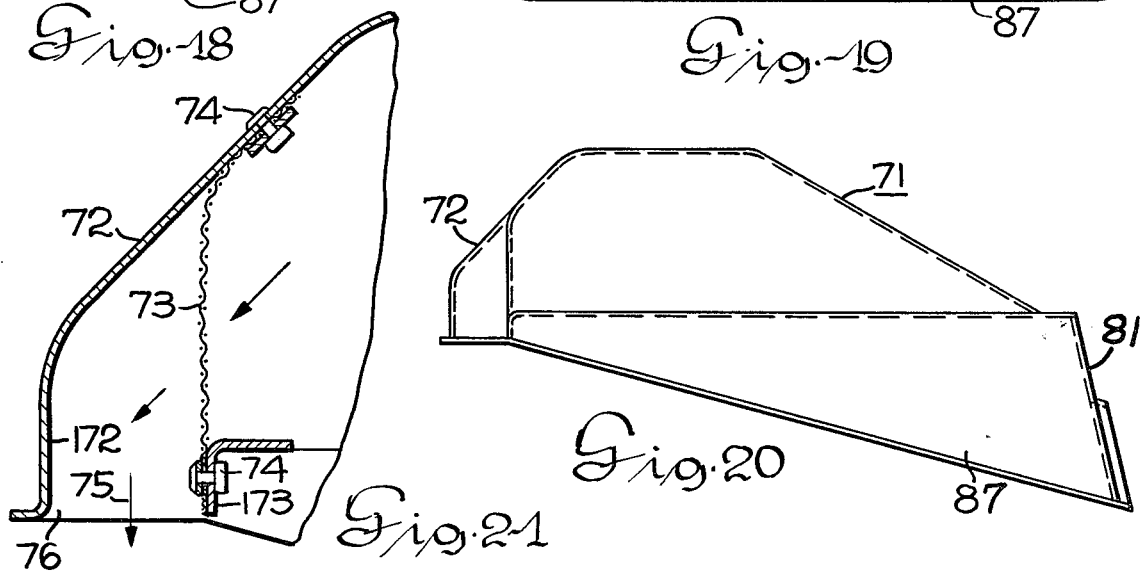

GRASS COLLECTING MULTIPLE BLADE MOWER WITHOUT AUXILIARY BLOWER MEANS

BACKGROUND OF THE INVENTION

Heretofore others have provided riding lawnmowers with grass catchers. One such unit is shown in U.S. Pat. No. 3,716,977. In the mower unit illustrated in the abovementioned U.S. patent, the air movement created by the single blade is sufficient, under normal conditions, to propel the grass clippings rearwardly through the discharge tube to the grass catcher without auxiliary blower means. However, it has not been practical heretofore to utilize the air movement generated by a mutiple blade mower unit to move the clippings to a rear mounted catcher without the use of an auxiliary blower.

It is an object of the present invention to provide a multiple blade tractor mower with a discharge conduit and a rear mounted grass catcher wherein the air movement created by the plurality of blades is effectively utilized to transport grass clippings to the rear mounted grass catcher without auxiliary blower assistance.

BRIEF DESCRIPTION OF THE INVENTION

Heretofore the lawn and garden industry has not perfected a multiple blade riding mower wherein the grass clippings are conveyed from the mower to a rear grass catcher without an auxiliary blower. In the present invention a unique elbow part is used in the conduit at the juncture of the conduit and the mower housing. The elbow bottom wall slopes upwardly immediately from the discharge opening of the mower housing and an elliptical cross-section shape is maintained in the elbow from near its connection to the housing through the curvature of the elbow part. The major axis of the ellipse changes from a longitudinal horizontal disposition at the part of the elbow adjacent the mower housing to an upward and outward sloping disposition at the portion of the elbow part approximately 90° from the connection of the elbow part to the mower housing. Thus, the grass clippings are lifted to a somewhat greater height in the radially outer part of the curve in the elbow than on the inner part of the curve. The somewhat higher velocity of the air flow at the outer part of the curve helps to keep the grass clippings entrained in the air. In order to prevent excessive back pressure in the grass catcher (which would interfere with the movement of the grass and the air through the conduit), the grass catcher is adequately ventilated thereby permitting air to freely escape therefrom. Additionally, the mower housing is provided with baffles to assist in developing adequate air flow from the mower housing, which air flow is generated by lift surfaces on the outer ends of the mower blades.

BRIEF DESCRIPTION OF THE DRAWINGS

The preferred embodiment of the invention is illustrated in the drawings wherein:

FIG. 1 is a side view of a tractor mower combination utilizing the present invention;

FIG. 2 is a partial top view of the tractor mower combination shown in FIG. 1, with parts broken away for illustration purposes;

FIG. 3 is a section view taken on the line III—III in FIG. 1;

FIG. 4 is a view taken along the line IV—IV in FIG. 1;

FIG. 5 is a section view taken along the line V—V in FIG. 4;

FIG. 6 is an enlarged view of a baffle installed in the housing as shown in FIG. 4;

FIG. 7 is an end view of the baffle shown in FIG. 6;

FIG. 8 is an enlarged view of a baffle which is shown in its installed condition in the mower housing in FIG. 4;

FIG. 9 is a front view of the baffle shown in FIG. 8;

FIG. 10 is a top view of the elbow part of a conduit between the mower housing and the grass catcher;

FIG. 11 is the side view of the elbow part shown in FIG. 10;

FIGS. 12 and 13 are section views through the elbow part in FIG. 10;

FIG. 14 is a section view through the elbow part taken on line XIV—XIV in FIG. 11;

FIGS. 15, 16 and 17 are section views taken on lines XV—XV, XVI—XVI and XVII—XVII in FIG. 4;

FIGS. 18, 19 and 20 are rear, top and side views, respectively, of the cover of the grass catcher shown in FIGS. 1 and 2; and FIG. 21 is a section view taken on the line XXI—XXI in FIG. 19.

DETAILED DESCRIPTION OF THE DRAWINGS

The tractor mower combination shown in FIGS. 1 and 2 includes a tractor 31 having a pair of drive wheels 32, 33 and a pair of steerable front wheels 34, 36. An operator's station 37 and a steering wheel 38 are provided at the rear of the tractor and an engine 39 is mounted on the front of the main frame 40 of the tractor 31. The engine 39 is drivingly connected to the rear drive wheels 32, 33 in a conventional manner by a drive train, not shown. The mower unit 41 is connected to the engine 39 through a V-belt 42 which drivingly engages pulleys 43, 44 secured for rotation with vertical shafts or spindles 46, 47 disposed to define laterally spaced vertical axes 46', 47'. The axis 47' closest to the discharge opening is spaced rearwardly of axis 46'. The front of the mower housing 51 of the mower unit 41 is suspended from the front axle 55 of the tractor 31 by a pair of transversely spaced links 52, only one of which is shown. The rear of the mower housing 51 is supported by a pair of ground wheels 53, one of which is mounted on a rearwardly extending leg of a transverse shaft or rod 54. An upright lever 56 is connected to rod 54 and is shiftable to any one of a plurality of positions of detented cooperation with a notched bracket 57 to achieve raising and lowering of the rear of the housing 51. The front of the mower housing 51 is simultaneously raised and lowered with the rear of the housing by action of a push-pull rod 57' operatively interconnecting the rod 54 and link 52.

A grass catcher 61 is removably mounted on a bracket 62 secured to the rear part 63 of the tractor frame 40. A grass catcher frame 66, to which a flexible bag 67 is secured as by a zipper connection, includes a pair of downwardly extending cylindrical parts 68 which telescopically fit over a pair of laterally spaced upstanding posts 64 of the bracket 62. If it is desired to remove the grass catcher 61, the grass catcher frame 66 is lifted upwardly from the posts 64. The grass catcher 61 includes a molded plastic impervious cover 71 which has a rearwardly extending discharge port or hood 72 which extends substantially the full width of the cover 71. Referring also to FIGS. 18 through 21, a vertical screen 73 is fastened by rivets 74 to the cover 71 to prevent grass clippings from being carried by exhausting air from the grass catcher. It will be noted that the air exhausted from the grass catcher is directed downwardly in the direction of arrow 75 in FIG. 21 through the downwardly facing vent or opening 76' of the exhaust hood 72 defined by parallel transverse vertical walls 172, 173. The size of the discharge opening is relatively large thereby (1) minimizing pressure differential between the inside and outside of the cover, and (2) providing a low discharge velocity for air exhausted from the grass catcher which minimizes entrainment of dust and clippings in the discharged air thus providing a cleaner environment for the operator and avoiding rapid build-up of grass clippings on the vent screen 73. The cover 71 has a downwardly extending apron 81 at the front thereof in which a pair of laterally spaced recesses 82 are formed for receiving a discharge tube such as the illustrated discharge conduit 76. The two recesses 82 permit the cover to be used for rear mounted grass catchers on mowers having either right or left discharging mower units. The cover 71 also includes laterally opposite tapered side walls 87, 88 which reinforce the front wall 81 and together therewith serves as a dust shield.

Referring to FIGS. 1, 2 and 3, the discharge conduit 76 includes two parts. A rear tubular part 78 of clear plastic has its rear end extending through an opening in the bag 67 and its front end is flexibly bent to an ellipitical cross-sectional shape and slipped over the elliptical rear end 146 of an elbow or elbow part 77 of the discharge conduit 76. The resiliency of the tubular part 78 causes it to grip the elbow part 77 with sufficient force to maintain the parts 77, 78 in telescopic assembled condition. The front of the elbow part is secured to the lateral side of the mower housing 51 by releasable fastening means such as bolts 84 and nuts 85. The elbow part is described in greater detail in a subsequent part of this description.

Referring also to FIGS. 4 and 5, the downwardly opening mower housing 51 includes a top wall 91, a front wall 92 and a rear wall 93. These walls terminate at one lateral side of the housing 51 in a discharge opening 94. A vertical lateral wall 95 closes off the side of the housing opposite the opening 94. A generally rectangular inlet opening 96, defined by the walls of the elbow part 77 of the conduit means 76, is in generally aligned relation to the lateral discharge opening 94 in the mower housing 51. The front wall 92 is actually a front vertical wall of a baffle 101 which includes a vertical end wall 102 disposed at an acute angle to the front wall 92. The baffle 101 is secured to the housing 51 by bolts 103 and nuts 104 and is used to modify an existing mower housing which had a lateral opening wider in the fore and aft direction than the desired opening 94. If it is desired to use the mower without a bagging attachment, the baffle 101 may be removed to permit the clippings to be dispersed in a wider pattern than would be the case of a housing having a narrower discharge opening. It should be understood, of course, that the housing 51 could be formed with the forward wall 105 disposed in the position of the wall 92 of the baffle 101, in which case, there would be no need for the baffle 101. A pair of identical blades 106, 106' are secured to the spindles 47, 46 by suitable nuts 107. The spindles 46, 47 are rotatably mounted by bearings, not shown, on the top wall 91 of the housing 51. As the blades are rotated their tips define a circular path indicated by the dash lines 108, 109. As appears in FIG. 4, the circles 108, 109 are closely adjacent the front wall 92 of the housing 51. It has been found that the position of the front wall of the housing in a closely adjacent or nearly tangential position to the tip paths of the blades 106 contributes to efficient movement of air and clippings to the discharge opening 94. Two other vertical baffles 111, 112 are also secured on the inside of the blade housing 51 by suitable fastening means in the form of bolts 103 and nuts 104. The baffle 111 provides a curved vertical wall 116 adjacent the path 108 of the blade 106 and also a curved vertical wall 117 adjacent the path 109 of the blade 106'. The baffle 111 is not new in the lawn mower industry and has heretofore been utilized to increase the efficiency of movement of air and clippings from the mower housing. However, baffle 112 is believed to be a new baffle which is employed to further increase the efficiency of movement of air and clippings from the mower housing 51. The baffle 112 includes a curved wall 113 and a straight wall 121 which direct the air and clippings propelled by rotation of the blade 106' in the direction indicated by arrows 126 from the mower housing 51 by way of tunnel 123 in the front upper part of the mower housing, which tunnel is substantially parallel to a plane through the axes 46', 47' of the spindles 46, 47. The vertical wall 121 of the baffle 112 serves as an air cutoff for the blade 106 and as part of the rear wall of the tunnel 123.

As shown in FIG. 5, the mower blade 106' has its radially outer ends bent whereby the trailing edges slope upwardly to form lift portions so as to provide a fan to lift the clippings and generate air movement of sufficient volume to entrain the cut particles of grass. The other blade 106 is similarly formed. As shown in FIGS. 4, 15, 16 and 17 the tunnel 123 above the blades 106, 106' in the front part of the mower housing, is formed in part by providing two different elevations in the top wall 91 as shown in FIGS. 15 and 16 and partly by provision of the baffle 112. The part 191 of the top wall 91 of the housing 51 is higher than the part 192 of the top wall 91 and these parts 191, 192 are joined by a generally vertical wall section 193. This is clearly shown in FIGS. 15, 16 and 17. The part 191 starts to slope downwardly starting at a point in front of spindle 46 and merges with part 192 of the top wall at a point laterally outward from spindle 46. The vertical wall 121 of baffle 112 serves as an air cutoff for the blade 106' whereby the blade delivers air to the tunnel 123 at a relatively high flow rate. Since the tunnel 123 is at the forward part of the blade housing 51 where the blades 106 and 106' sever the grass, the grass clippings are entrained in the relatively high volume movement of the air in the direction of the arrows 126 and move to the outlet 94 of the housing 51 and into the inlet opening 96 of the elbow part 77 of the discharge conduit 76.

Referring to FIGS. 1 through 3 and 10 through 14, the elbow part 77 is a molded, relatively rigid plastic part which is contoured so as not to have dead spots. In other words, there is sufficient velocity of air blown throughout the interior of the elbow part to effectively convey clippings to tubular part 78 and thence to the grass catcher. This is achieved by sloping the top and bottom walls 152, 151 of the elbow part upwardly starting adjacent its intake opening 96 and at the same time curving the elbow part 77 in a rearward direction. The intake opening 96 is a generally elliptical or rectangular opening as illustrated in FIG. 12 which shows the cross-section of the elbow part at approximately 0° of the 90° elbow configuration, as viewed in FIG. 10, and assuming the elbow curvature to be measured in a clockwise direction. At about 30° through the 90° curve of the elbow part 77 the cross-section of the elbow part undergoes a transition toward a more definite elliptical shape as illustrated in FIG. 13. The transition to a nearly true elliptical shape continues to the section XIV—XIV, as illustrated in FIG. 14, which is approximately at the end of the 90° curvature of the elbow part 77. The part 146 of the elbow terminates in a rearwardly facing elliptical or curvilinear opening 146'. During the transition the major dimension, as measured on the major axis, becomes smaller whereas the minor dimension at right angles thereto remains substantially constant. The major axis 141 of the elliptical cross-section of the elbow part 77 changes its position from the generally horizontal disposition at the opening 96 to an upwardly and outwardly disposed position at an acute angle of 30° to the horizon, as shown in FIG. 13, to an upwardly and outwardly sloping position at section XIV—XIV, as shown in FIG. 14, which is at an angle greater than 45° in relation to the horizon. The cross-section of the elbow part changes gradually from a rectangular-elliptical shape at the longitudinal vertical section taken on line XII—XII at the start of the elbow curvature, wherein the major axis 141 is longitudinally and horizontally disposed, to an elliptical shape at approximately the 90° position of the elbow as viewed on line XIV—XIV, wherein the major axis 141 slopes upwardly and outwardly in relation to the center of curvature of the elbow part 77. In other words, the elbow part 77 maintains a substantially elliptical configuration from a point near its intake opening 96 through a predetermined number of degrees constituting a major portion of the curvature of the elbow part 77 and terminates in a curvilinear, rearward facing discharge opening 146'. Thus, material and air flowing through the elbow part to the grass catcher will be raised to a higher elevation at the laterally outer side of the end section 146 than at the side of the latter closest to the mower housing. Referring also to FIG. 4 it will be noted that the tunnel 123 slopes rearwardly from the closed side of the housing 51 to the discharge 94, and the front wall 144 of the elbow part 77 is a smooth continuation of the front wall 92 of the tunnel 123. This not only helps to avoid dead spots, where low velocity or eddy currents conditions may occur, but also gives an initial rearward component to the air and clippings entering the elbow.

The described combination of the two blade mower housing 51 with walls defining a laterally outwardly and rearwardly directed tunnel, the discharge conduit with elbow part shaped to raise and turn the air and clippings rearwardly, while maintaining good flow across its interior cross-section, and the adequately ventilated rear grass catcher combine to efficiently achieve a grass catching operation without need of an auxiliary blower. The illustrated tractor mower has two 18.5 inch blades which produce a 36 inch wide cut. The tubular part 78 of the discharge conduit has an internal cross-sectional area of 33 square inches and the cross-sectional area of the grass catcher cover vent opening 76' is 56 square inches. Thus, the vent opening 76' is over one and one half times larger in the cross-sectional area than the cross-sectional area of the interior of the tubular part 78. More precisely the vent opening is 1.8 times as large as the tubular part in the cross-sectional area.

The embodiments of the invention in which an exclusive property or privilege is claimed are defined as follows:

1. In combination with a tractor, having traction wheels for moving the tractor in a forward direction,
   a downwardly opening, mower housing suspended from said tractor having top, front and rear walls, a sidewall at one lateral side thereof and a lateral discharge opening in the other lateral side thereof,
   a pair of horizontally disposed blades rotatably mounted on said housing for rotation about laterally spaced vertical axes, said axis disposed closest to said discharge opening being spaced rearward of the other axis, said blades having lift portions to generate air movement,
   a grass catcher supported on the rear of said tractor including vent means permitting a high volume flow of air therefrom, and
   conduit means interconnecting said discharge opening and said grass catcher including walls defining an elbow part having a laterally facing intake opening at its front end in generally aligned relation to said discharge opening of said housing, the major dimension of said intake opening being in a longitudinal, horizontal direction and the minor dimension of said intake opening being in a generally vertical direction,
   said wall defining said elbow part sloping upwardly, laterally outwardly and rearwardly immediately from said intake opening to present a rearward facing opening, said elbow part having an elliptical cross-section from a portion thereof relatively near its intake opening through a predetermined number of degrees constituting a major portion of its curvature and wherein the major axis of said elliptical cross-section slopes upwardly in a radially outward direction at a gradually increasing pitch from a cross-section near said intake opening to a cross-section at said predetermined number of degrees therefrom.

2. The combination of claim 1 wherein said mower housing includes wall means defining a tunnel at the forward end above said blades which extends laterally and rearwardly to said discharge opening.

3. The combination of claim 2 wherein a plane through said vertical axes is substantially parallel to said tunnel.

4. The combination of claim 3 wherein said front wall of said housing is nearly tangential to the circular paths of the tips of said blades.

5. The combination of claim 4 wherein said grass catcher includes a cover having a screened vent extending across substantially the full transverse width thereof.

6. The combination of claim 1 wherein the rear of said elbow part is curvilinear.

7. The combination of claim 6, wherein the major axis dimension of said rear of said elbow part is substantially less than the major axis dimension of said intake opening.

8. The combination of claim 1 wherein said mower housing includes wall means defining a tunnel at the forward end above said blades terminating at said discharge opening and including a vertical baffle adjacent said rear wall of said tunnel serving as air cut off means for the blade remote from said discharge opening.

9. In a combination with a tractor, having traction wheels for moving the tractor in a forward direction, a downwardly opening mower housing suspended from said tractor having top, front and rear walls, a sidewall at one lateral side thereof and a lateral discharge opening in the other lateral side thereof, at least one horizontally disposed blade rotatably mounted on and within said housing for rotation about a vertical axis, said blade having lift portions operative to generate air movement, a grass catcher supported on the rear of said tractor including vent means permitting a high volume flow of air therefrom, and conduit means interconnecting said discharge opening and said grass catcher including walls defining an elbow part having a laterally facing intake opening at its front end in generally aligned relation to said discharge opening of said housing, the major dimension of said intake opening being in a longitudinal, horizontal direction and the minor dimension of said intake opening being in a generally vertical direction, said walls defining said elbow part sloping upwardly, laterally outwardly and rearwardly immediately from said intake opening to present a rearward facing opening, said elbow part having an elliptical cross-section from a portion thereof relatively near its intake opening through a predetermined number of degrees constituting a major portion of its curvature and wherein the major axis of said elliptical cross-section slopes upwardly in a radially outward direction at a gradually increasing pitch from a cross-section near said intake opening to a cross-section at said predetermined number of degrees therefrom.

* * * * *